United States Patent
Zhou et al.

(10) Patent No.: US 9,832,066 B2
(45) Date of Patent: Nov. 28, 2017

(54) PORT NUMBER EXTENSION METHOD AND SWITCH

(71) Applicant: Huawei Technologies Co., Ltd., Shenzhen (CN)

(72) Inventors: Qingsong Zhou, Nanjing (CN); Guangrui Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 181 days.

(21) Appl. No.: 14/943,789

(22) Filed: Nov. 17, 2015

(65) Prior Publication Data

US 2016/0149747 A1    May 26, 2016

(30) Foreign Application Priority Data

Nov. 20, 2014  (CN) .......................... 2014 1 0667688

(51) Int. Cl.
*H04L 12/28* (2006.01)
*H04L 29/06* (2006.01)
*H04L 29/08* (2006.01)
*H04L 29/12* (2006.01)
*H04L 12/931* (2013.01)
*H04L 12/753* (2013.01)

(52) U.S. Cl.
CPC .......... *H04L 29/0653* (2013.01); *H04L 45/48* (2013.01); *H04L 49/70* (2013.01); *H04L 61/6004* (2013.01); *H04L 61/6022* (2013.01); *H04L 69/322* (2013.01)

(58) Field of Classification Search
CPC ....................................... H04L 12/28

USPC ......................................................... 370/393
See application file for complete search history.

(56) References Cited

U.S. PATENT DOCUMENTS

2008/0239946 A1* 10/2008 Morita ................ H04L 41/0677
                                                              370/217

OTHER PUBLICATIONS

Barta, M., "Telefonica O2 CR Training Switching," Cisco, XP002755745, Jun. 3, 2011, 2 pages.
"Standard for Information technology—Telecommunications and information exchange between systems—Local and metropolitan area networks—Common specifications—Part 3: Media Access Control (MAC) Bridges: Technical and editorial Corrections," IEE Draft P802.1t/D10, Nov. 20, 2000, 50 pages.
Foreign Communication From a Counterpart Application, European Application No. 15191361.3, Extended European Search Report dated Apr. 4, 2016, 8 pages.

* cited by examiner

*Primary Examiner* — Dang Ton
(74) *Attorney, Agent, or Firm* — Conley Rose, P.C.

(57) ABSTRACT

A port number extension method and a switch are provided. A first switch determines bits for identifying the first switch in a Media Access Control (MAC) address in an identifier (ID) of a specified bridge; calculates a bit for port number extension according to the bits for identifying the first switch; and combines the bit for port number extension and original bits for specifying a port, to obtain new bits for specifying a port. In this way, a problem that Spanning Tree Protocol (STP) port numbers are insufficient in a super virtual fabric with a massive quantity of ports is resolved.

19 Claims, 3 Drawing Sheets

```
┌─────────────────────────────────────────────────┐
│  A first switch determines bits for identifying the first │──┐
│  switch in a MAC address in an ID of a specified bridge    │  │ S201
└─────────────────────────────────────────────────┘
                          │
                          ▼
┌─────────────────────────────────────────────────┐
│  The first switch calculates, according to the bits for   │──┐
│  identifying the first switch, a bit for port number      │  │ S202
│  extension                                                 │
└─────────────────────────────────────────────────┘
                          │
                          ▼
┌─────────────────────────────────────────────────┐
│  The first switch combines the bit for port number        │──┐
│  extension and original bits for specifying a port, to    │  │ S203
│  obtain new bits for specifying a port                    │
└─────────────────────────────────────────────────┘
```

| DMA | SMA | L/T | LLC header | Payload |
|---|---|---|---|---|
| 0x0180c2000000 | | | 0x424203 | BPDU data packet |

| Field value | Byte |
|---|---|
| Protocol ID | 2 |
| Protocol version | 1 |
| BPDU type | 1 |
| Flag | 1 |
| ID of a root bridge | 8 |
| Shortest path cost | 4 |
| ID of a specified bridge | 8 |
| ID of a specified port | 2 |
| Message life span | 2 |
| Longest life span | 2 |
| Call time | 2 |
| Forward latency | 2 |

FIG. 1

PORT NUMBER EXTENSION METHOD AND SWITCH

CROSS-REFERENCE TO RELATED APPLICATION

This application claims priority to Chinese Patent Application No. 201410667688.9, filed on Nov. 20, 2014, which is hereby incorporated by reference in its entirety.

TECHNICAL FIELD

The present invention relates to the field of communications technologies, and in particular, to a port number extension method and a switch.

BACKGROUND

On a switching network at a data link layer, when a switch transmits packets, if a loop exists on the network, some packets continuously multiply and endlessly cycle on a loop network, and therefore packet processing capability of the switch is reduced because a same packet is repeatedly received.

To prevent occurrence of the foregoing problem, the Spanning Tree Protocol (STP) emerges, where the protocol is established according to an Institute of Electrical and Electronics Engineers (IEEE) standard, and is used to collect and eliminate, on a local area network, physical loops at a data layer. Switches that run the protocol discover a loop on a network by exchanging information with each other, and selectively block some ports. Finally, a loop network structure is built into a loop-free tree network, thereby preventing occurrence of a broadcast storm. Generally, a protocol packet used by the STP is a bridge protocol data unit (BPDU). The BPDU includes sufficient information to ensure that a device completes a calculation process of a spanning tree, and the STP determines a topology structure of a network by transmitting the BPDU between devices. FIG. 1 is a schematic diagram of a packet format of a BPDU in the prior art. As shown in FIG. 1, an identifier (ID) of a specified port includes a priority and a port number of the specified port, and occupies a total of 2 bytes, where the priority of the specified port occupies 4 bits, and the port number occupies 12 bits. That is, the switch may use a maximum of 4095 port numbers.

However, in a super virtual fabric (super virtual switching network), multiple switches need to be virtualized into one logical device, to provide unitary configuration and management outwards. On the virtual switching network, a quantity of ports of the logical device may exceed 4095. However, currently port numbers of a switch occupy only 12 bits, and cannot identify all ports.

SUMMARY

The present invention provides a port number extension method and a switch, so as to resolve a problem that STP port numbers are insufficient in a super virtual fabric with a massive quantity of ports.

According to a first aspect, the present invention provides a port number extension method, including determining, by a first switch, bits for identifying the first switch in a Media Access Control (MAC) address in an ID of a specified bridge; calculating, by the first switch according to the bits for identifying the first switch, a bit for port number extension; and combining, by the first switch, the bit for port number extension and original bits for specifying a port, to obtain new bits for specifying a port.

According to a second aspect, the present invention provides a switch, including a determining module configured to determine bits for identifying the switch in a MAC address in an ID of a specified bridge; a calculation module configured to calculate, according to the bits for identifying the switch, a bit for port number extension; and a combination module configured to combine the bit for port number extension and original bits for specifying a port, to obtain new bits for specifying a port.

In the present invention, a first switch determines bits for identifying the first switch in a MAC address in an ID of a specified bridge; then, calculates, according to the bits for identifying the first switch, a bit for port number extension; and finally combines the bit for port number extension and original bits for specifying a port, to obtain new bits for specifying a port. In this way, the original bits for specifying a port are extended from 12 bits to more than 12 bits, and therefore a problem that STP port numbers are insufficient when a quantity of ports on a switch is greater than 4095 can be resolved.

BRIEF DESCRIPTION OF DRAWINGS

FIG. 1 is a schematic diagram of a packet format of a BPDU in the prior art;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

Figure 2:
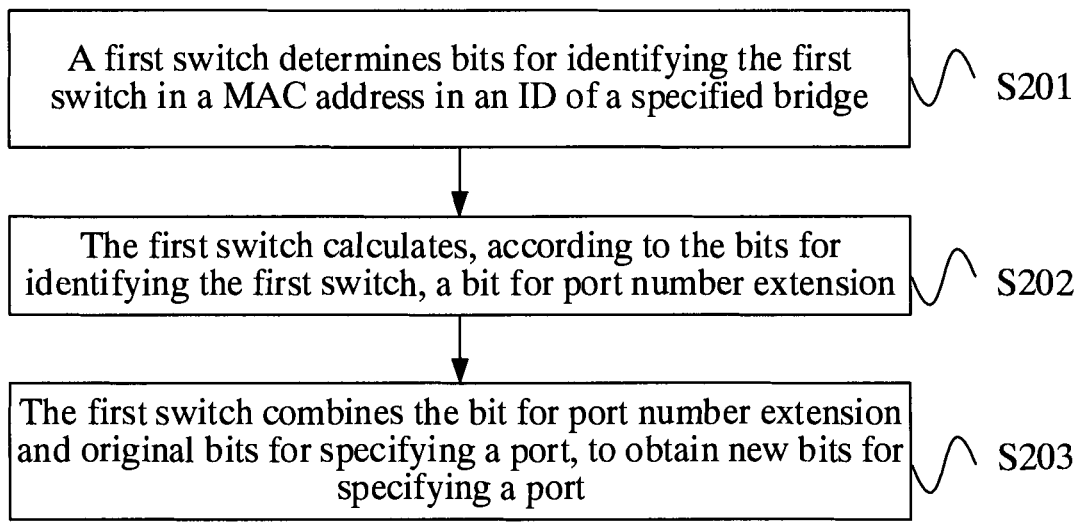
FIG. 2 is a flowchart of a port number extension method according to an embodiment of the present invention.

FIG. 2 is a flowchart of a port number extension method according to an embodiment of the present invention, where the method is applicable to a scenario in which a switching network at a data link layer uses the STP, and the method is executed by a first switch. A process of the port number extension method is as follows.

S201: The first switch determines bits for identifying the first switch in a MAC address in an ID of a specified bridge.

The STP is used to collect and eliminate, on a local area network, physical loops at a data layer. A BPDU packet is a frame that is exchanged between switches that run the STP. The BPDU packet includes path and priority information needed by the STP, and the STP determines a root bridge and a path of the root bridge by using the information. With reference to what is shown in FIG. 1, the BPDU packet includes a protocol ID: the value is always 0; a protocol version: a version of the STP, where the value is generally 0 in IEEE 802.1D; a BPDU type; an ID of a root bridge: indicating an identifier of a device that has been selected as the root bridge; and shortest path cost: path costs are STP costs for arriving at the root bridge switch. An "identifier ID of a specified bridge" included in a BPDU packet sent by the first switch refers to information about a bridge that sends the BPDU packet (that is, the first switch). The "identifier ID of the specified bridge" includes a priority and a MAC address of the specified bridge. The priority occupies 16 bits, and the MAC address occupies 48 bits. Generally, one switch has 16 to 256 MAC addresses, of which the first three bytes, that is, 24 high-order bits, are code that the Registration Authority (RA) of the IEEE allocated to different vendors, and are also referred to as an "unique identifier in compilation", and the last three bytes, that is, 24 low-order bits, are assigned by the vendors on their own to interfaces of manufactured adapters, and are referred to as an extended identifier. A high-order bit part in the 24 low-order bits is used to identify a switch device, where the high-order bit part herein may be 10 high-order bits, 20 high-order bits, or the like in the 24 low-order bits, and generally has been set. When a BPDU packet is sent, only a specified bridge, that is, the first switch herein, needs to be identified; therefore, the first switch needs to determine only the bits for identifying the first switch in the MAC address in the ID of the specified bridge. In addition, an ID of a specified port is used to indicate an ID of a bridge port that sends the BPDU packet; and a timer configured to show a time used by a spanning tree to complete each function of the spanning tree, and the like.

S202: The first switch calculates, according to the bits for identifying the first switch, a bit for port number extension.

The calculating, by the first switch according to the bits for identifying the first switch, a bit for port number extension includes using, in an order from a low-order bit to a high-order bit, a bit before the bits for identifying the first switch as the bit for port number extension. If the bits for identifying the first switch in the MAC address in the ID of the specified bridge are the $4^{th}$ to $23^{rd}$ bits, and then the $0^{th}$ to $3^{rd}$ bits are the bits that may be used for port number extension, where the $24^{th}$ to $47^{th}$ bits are code that the RA of the IEEE allocated to different vendors.

S203: The first switch combines the bit for port number extension and original bits for specifying a port, to obtain new bits for specifying a port.

Original bits for specifying a port in a BPDU packet are 12 bits, and the present invention extends the original bits for specifying a port. Optionally, the combining, by the first switch, the bit for port number extension and original bits for specifying a port, to obtain new bits for specifying a port includes combining, by the first switch in the order from a low-order bit to a high-order bit, the bit for port number extension and the original bits for specifying a port, to obtain the new bits for specifying a port; or combining, by the first switch in an order from a high-order bit to a low-order bit, the bit for port number extension and the original bits for specifying a port, to obtain the new bits for specifying a port.

Optionally, before the combining, by the first switch, the bit for port number extension and original bits for specifying a port, to obtain new bits for specifying a port, the method further includes sending, by the first switch, a probe packet to a second switch, where the probe packet carries a first parameter, and the first parameter is used to indicate a length of the bit, of the first switch, for port number extension; receiving, by the first switch, a probe response packet sent by the second switch, where the probe response packet carries a second parameter, and the second parameter is used to indicate a length of a bit, of the second switch, for port number extension; comparing, by the first switch, the first parameter with the second parameter; and if the first parameter is the same as the second parameter, sending, by the first switch, a BPDU packet to the second switch, where the BPDU packet is used for information exchange between the first switch and the second switch, the BPDU packet includes path and priority information needed by the STP, and the STP determines a root bridge and a path of the root bridge by using the information; or if the first parameter is different from the second parameter, determining, by the first switch, a smaller value in the first parameter and the second parameter; and if the first parameter is the smaller value, sending, by the first switch, a negotiation message to the second switch, where the negotiation message includes the first parameter, so that the second switch adjusts, according to the first parameter, the bit, of the second switch, for port number extension; or if the second parameter is the smaller value, adjusting, by the first switch according to the second parameter, the bit, of the first switch, for port number extension.

The adjusting, by the first switch according to the second parameter, the bit, of the first switch, for port number extension includes using the bit, of the first switch, for port number extension in the order from a low-order bit to a high-order bit, where the length of the bit, of the first switch, for port number extension is adjusted to the second parameter.

Further, before the receiving, by the first switch, a probe response packet sent by the second switch, the method includes setting, by the first switch, a port, of the first switch, supporting port bit extension to a blocked state, to avoid that when a peer end, that is, the second switch, does not support an extension mode, the STP works abnormally, and a loop is generated accordingly. If a quantity of ports on the first switch is less than or equal to 4095, a port may be not specified by using the extended bits for specifying a port; when a quantity of ports is greater than 4095, a port may be specified by using the extended bits for specifying a port.

This embodiment provides a port number extension method, including first, determining, by a first switch, bits for identifying the first switch in a MAC address in an ID of a specified bridge; second, calculating, by the first switch according to the bits for identifying the first switch, a bit for port number extension; and finally, combining, by the first switch, the bit for port number extension and original bits for specifying a port, to obtain new bits for specifying a port. In this way, the original bits for specifying a port are extended from 12 bits to more than 12 bits, and therefore a problem that STP port numbers are insufficient when a quantity of ports on a switch is greater than 4095 can be resolved.

Figure 3:
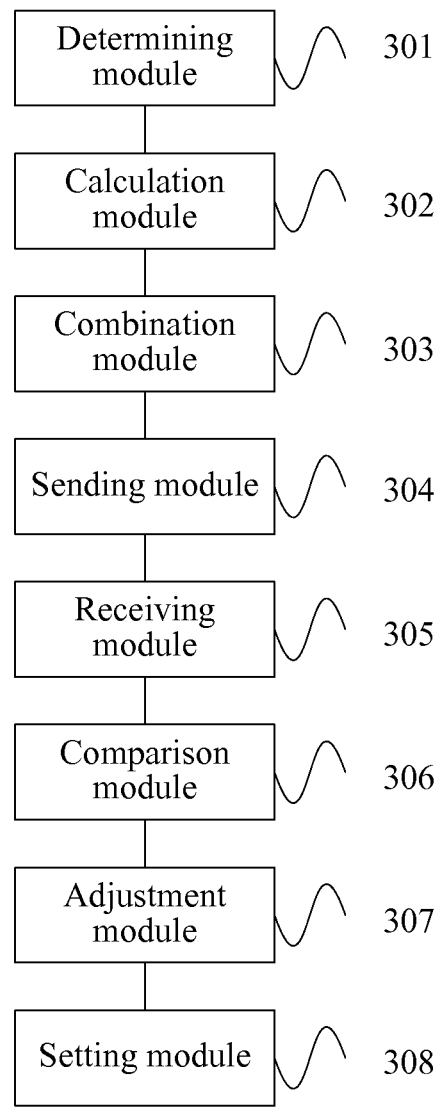
FIG. 3 is a schematic structural diagram of a switch according to an embodiment of the present invention.

FIG. 3 is a schematic structural diagram of a switch according to an embodiment of the present invention, including a determining module 301 configured to determine bits for identifying the switch in a MAC address in an ID of a specified bridge; a calculation module 302 configured to calculate, according to the bits for identifying the switch, a bit for port number extension; and a combination module 303 configured to combine the bit for port number extension and original bits for specifying a port, to obtain new bits for specifying a port. The calculation module 302 is configured to use, in an order from a low-order bit to a high-order bit, a bit before the bits for identifying the switch as the bit for port number extension.

Optionally, the switch further includes a sending module 304 configured to send a probe packet to a second switch, where the probe packet carries a first parameter, and the first parameter is used to indicate a length of the bit, of the first switch, for port number extension; a receiving module 305 configured to receive a probe response packet sent by the second switch, where the probe response packet carries a second parameter, and the second parameter is used to indicate a length of a bit, of the second switch, for port number extension; and a comparison module 306 configured to compare the first parameter with the second parameter, where the sending module 304 is further configured to, when the first parameter is the same as the second parameter, send a BPDU packet to the second switch, where the BPDU packet is used for information exchange between the first switch and the second switch.

Further, the switch includes an adjustment module 307 configured to, when the first parameter is different from the second parameter, determine a smaller value in the first parameter and the second parameter; and if the first parameter is the smaller value, send a negotiation message to the second switch, where the negotiation message includes the first parameter, so that the second switch adjusts, according to the first parameter, the bit, of the second switch, for port number extension; or if the second parameter is the smaller value, adjust, according to the second parameter, the bit, of the switch, for port number extension.

Optionally, when the bit, of the switch, for port number extension is adjusted according to the second parameter, the adjustment module 307 is configured to use the bit, of the first switch, for port number extension in the order from a low-order bit to a high-order bit, where the length of the bit, of the first switch, for port number extension is adjusted to the second parameter.

Further, the combination module 303 is configured to combine, in the order from a low-order bit to a high-order bit, the bit for port number extension and the original bits for specifying a port, to obtain the new bits for specifying a port; or combine, in an order from a high-order bit to a low-order bit, the bit for port number extension and the original bits for specifying a port, to obtain the new bits for specifying a port.

Furthermore, the switch includes a setting module 308 configured to set a port, of the switch, supporting port bit extension to a blocked state.

The switch provided in this embodiment can be configured to execute the port number extension method corresponding to FIG. 1, of which technical effects are the same, and details are not provided again herein.

Figure 4:
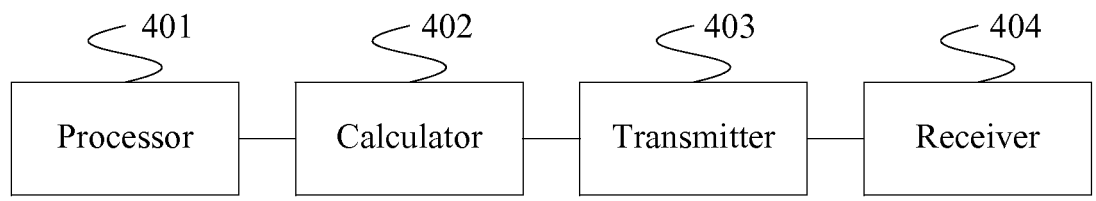
FIG. 4 is a schematic structural diagram of a switch according to another embodiment of the present invention.

FIG. 4 is a schematic structural diagram of a switch according to another embodiment of the present invention, where the switch includes a processor 401 configured to determine bits for identifying the switch in a MAC address in an ID of a specified bridge; and a calculator 402 configured to calculate, according to the bits for identifying the switch, a bit for port number extension, where the processor 401 is further configured to combine the bit for port number extension and original bits for specifying a port, to obtain new bits for specifying a port.

Optionally, the calculator 402 is configured to use, in an order from a low-order bit to a high-order bit, a bit before the bits for identifying the switch as the bit for port number extension.

Optionally, the switch further includes a transmitter 403 and a receiver 404, where the transmitter 403 is configured to send a probe packet to a second switch, where the probe packet carries a first parameter, and the first parameter is used to indicate a length of the bit, of the first switch, for port number extension; the receiver 404 is configured to receive a probe response packet sent by the second switch, where the probe response packet carries a second parameter, and the second parameter is used to indicate a length of a bit, of the second switch, for port number extension; the processor 401 is further configured to compare the first parameter with the second parameter; and the transmitter 403 is further configured to, when the first parameter is the same as the second parameter, send a BPDU packet to the second switch, where the BPDU packet is used for information exchange between the first switch and the second switch.

Further, the processor 401 is configured to, when the first parameter is different from the second parameter, determine a smaller value in the first parameter and the second parameter; and if the first parameter is the smaller value, send a negotiation message to the second switch, where the negotiation message includes the first parameter, so that the second switch adjusts, according to the first parameter, the bit, of the second switch, for port number extension; or if the second parameter is the smaller value, adjust, according to the second parameter, the bit, of the switch, for port number extension. When the bit, of the switch, for port number extension is adjusted according to the second parameter, the processor 401 is configured to use the bit, of the first switch, for port number extension in the order from a low-order bit to a high-order bit, where the length of the bit, of the first switch, for port number extension is adjusted to the second parameter.

Optionally, the processor 401 is configured to combine, in the order from a low-order bit to a high-order bit, the bit for port number extension and the original bits for specifying a port, to obtain the new bits for specifying a port; or combine, in an order from a high-order bit to a low-order bit, the bit for port number extension and the original bits for specifying a port, to obtain the new bits for specifying a port.

Furthermore, the processor 401 is configured to set a port, of the switch, supporting port bit extension to a blocked state.

The switch provided in this embodiment can be configured to execute the port number extension method corresponding to FIG. 1, of which technical effects are the same, and details are not provided again herein.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A port number extension method comprising:
   determining, by a first switch, bits for identifying the first switch in a Media Access Control (MAC) address in an identifier (ID) of a specified bridge;
   calculating, by the first switch according to the bits for identifying the first switch, a bit for port number extension;
   sending, by the first switch, a probe packet to a second switch, wherein the probe packet carries a first parameter, and wherein the first parameter is used to indicate a length of a bit of the first switch for port number extension;
   receiving, by the first switch, a probe response packet sent by the second switch, wherein the probe response packet carries a second parameter, and wherein the second parameter is used to indicate a length of a bit of the second switch for port number extension;
   comparing, by the first switch, the first parameter with the second parameter;

sending, by the first switch, a bridge protocol data unit (BPDU) packet to the second switch when the first parameter is the same as the second parameter, wherein the BPDU packet is used for information exchange between the first switch and the second switch; and combining, by the first switch, the bit for port number extension and original bits for specifying a port to obtain new bits for specifying a port.

2. The method according to claim 1, wherein calculating, by the first switch according to the bits for identifying the first switch, the bit for the port number extension comprises using, in an order from a low-order bit to a high-order bit, a bit before the bits for identifying the first switch as the bit for port number extension.

3. The method according to claim 1, further comprising:
determining, by the first switch, a smaller value in the first parameter and the second parameter when the first parameter is different from the second parameter;
sending, by the first switch, a negotiation message to the second switch when the first parameter is the smaller value, wherein the negotiation message comprises the first parameter such that the second switch adjusts, according to the first parameter, the bit, of the second switch, for port number extension; and
adjusting, by the first switch according to the second parameter, the bit, of the first switch, for port number extension when the second parameter is the smaller value.

4. The method according to claim 3, wherein adjusting, by the first switch according to the second parameter, the bit, of the first switch, for port number extension comprises using the bit, of the first switch, for port number extension in an order from a low-order bit to a high-order bit, wherein the length of the bit, of the first switch, for port number extension is adjusted to the second parameter.

5. The method according to claim 4, wherein combining, by the first switch, the bit for port number extension and the original bits for specifying the port, to obtain new bits for specifying the port comprises combining, by the first switch in the order from a low-order bit to a high-order bit, the bit for port number extension and the original bits for specifying a port, to obtain the new bits for specifying a port.

6. The method according to claim 1, wherein before receiving, by the first switch, the probe response packet sent by the second switch, the method further comprises setting, by the first switch, a port, of the first switch, supporting port bit extension to a blocked state.

7. The method according to claim 2, wherein before combining, by the first switch, the bit for port number extension and the original bits for specifying the port, to obtain new bits for specifying the port, the method further comprises:
sending, by the first switch, a probe packet to a second switch, wherein the probe packet carries a first parameter, and the first parameter is used to indicate a length of the bit, of the first switch, for port number extension;
receiving, by the first switch, a probe response packet sent by the second switch, wherein the probe response packet carries a second parameter, and the second parameter is used to indicate a length of bit, of the second switch, for port number extension;
comparing, by the first switch, the first parameter with the second parameter; and
sending, by the first switch, a bridge protocol data unit (BPDU) packet to the second switch when the first parameter is the same as the second parameter, wherein the BPDU packet is used for information exchange between the first switch and the second switch.

8. The method according to claim 1, wherein combining, by the first switch, the bit for port number extension and the original bits for specifying the port, to obtain new bits for specifying the port comprises combining, by the first switch in an order from a low-order bit to a high-order bit, the bit for port number extension and the original bits for specifying a port, to obtain the new bits for specifying a port.

9. A first switch comprising:
a hardware-implemented processor configured to:
determine bits for identifying the first switch in a Media Access Control (MAC) address in an identifier (ID) of a specified bridge;
calculate, according to the bits for identifying the first switch, a bit for port number extension;
send a probe packet to a second switch, wherein the probe packet carries a first parameter, and wherein the first parameter is used to indicate a length of a bit of the first switch for port number extension;
receive a probe response packet sent by the second switch, wherein the probe response packet carries a second parameter, and wherein the second parameter is used to indicate a length of a bit of the second switch for port number extension;
compare the first parameter with the second parameter;
send a bridge protocol data unit (BPDU) packet to the second switch when the first parameter is the same as the second parameter, wherein the BPDU packet is used for information exchange between the first switch and the second switch; and
combine the bit for port number extension and original bits for specifying a port to obtain new bits for specifying a port.

10. The first switch according to claim 9, wherein the hardware-implemented processor is further configured to use, in an order from a low-order bit to a high-order bit, a bit before the bits for identifying the first switch as the bit for port number extension.

11. The first switch according to claim 9, wherein the hardware-implemented processor is further configured to:
determine a smaller value in the first parameter and the second parameter when the first parameter is different from the second parameter;
send a negotiation message to the second switch when the first parameter is the smaller value, wherein the negotiation message comprises the first parameter such that the second switch adjusts, according to the first parameter, the bit, of the second switch, for port number extension; and
adjust, according to the second parameter, the bit, of the first switch, for port number extension when the second parameter is the smaller value.

12. The first switch according to claim 11, wherein when the bit, of the first switch, for port number extension is adjusted according to the second parameter, the hardware-implemented processor is further configured to use the bit, of the first switch, for port number extension in an order from a low-order bit to a high-order bit, and wherein the length of the bit, of the first switch, for port number extension is adjusted to the second parameter.

13. The first switch according to claim 12, wherein the hardware-implemented processor is further configured to combine, in the order from a low-order bit to a high-order bit or an order from a high-order bit to a low-order bit, the bit for port number extension and the original bits for specifying a port, to obtain the new bits for specifying a port.

14. The first switch according to claim 13, wherein the hardware-implemented processor is further configured to set a port, of the first switch, supporting port bit extension to a blocked state.

15. The first switch according to claim 10, wherein the hardware-implemented processor is further configured to:
   send a probe packet to a second switch, wherein the probe packet carries a first parameter, and wherein the first parameter is used to indicate a length of the bit, of the first switch, for port number extension;
   receive a probe response packet sent by the second switch, wherein the probe response packet carries a second parameter, and wherein the second parameter is used to indicate a length of a bit, of the second switch, for port number extension;
   compare the first parameter with the second parameter; and
   send a bridge protocol data unit (BPDU) packet to the second switch when the first parameter is the same as the second parameter, wherein the BPDU packet is used for information exchange between the first switch and the second switch.

16. The first switch according to claim 9, wherein the hardware-implemented processor is further configured to combine, in an order from a low-order bit to a high-order bit or an order from a high-order bit to a low-order bit, the bit for port number extension and the original bits for specifying a port, to obtain the new bits for specifying a port.

17. The method according to claim 4, wherein combining, by the first switch, the bit for port number extension and the original bits for specifying the port, to obtain new bits for specifying the port comprises combining, by the first switch in an order from a high-order bit to a low-order bit, the bit for port number extension and the original bits for specifying a port, to obtain the new bits for specifying a port.

18. The method according to claim 1, wherein combining, by the first switch, the bit for port number extension and the original bits for specifying the port, to obtain new bits for specifying the port comprises combining, by the first switch in an order from a high-order bit to a low-order bit, the bit for port number extension and the original bits for specifying a port, to obtain the new bits for specifying a port.

19. A port number extension method implemented by a first switch, the method comprising:
   determining bits for identifying the first switch in a media access control (MAC) address of an identifier (ID) of a specified bridge in a bridge protocol data unit (BPDU) packet;
   determining, according to the bits for identifying the first switch, at least one bit for extending a port number of the first switch in the BPDU packet;
   determining original bits for specifying the port number in the BPDU packet;
   inserting the port number into the at least one bit and the original bits; and
   sending the BPDU packet to a second switch in order for the second switch to identify the port according to the number.

* * * * *